United States Patent [19]

Leonardo et al.

[11] Patent Number: 4,874,619

[45] Date of Patent: Oct. 17, 1989

[54] METHOD FOR BLACK DYEING PASTA FOODSTUFFS, AND FOODSTUFFS OBTAINED BY SAID METHOD

[76] Inventors: Covi Leonardo, via Umbria 2; Bacialli Giorgio, Via Lamponi, 12; Degli E. Raffaele, Via Venturoli, 65, all of Bologna, Italy

[21] Appl. No.: 221,996

[22] Filed: Jul. 20, 1988

[30] Foreign Application Priority Data

Jul. 20, 1987 [IT] Italy .................................. 3561 A/87

[51] Int. Cl.$^4$ ....................... H23L 1/16; H23L 1/275; H21D 2/36
[52] U.S. Cl. ...................................... 426/94; 426/250; 426/262; 426/270
[58] Field of Search .................... 426/94, 92, 250, 240, 426/557, 262, 270

[56] References Cited

FOREIGN PATENT DOCUMENTS 2107759 11/1985 Japan .................................. 426/270
1135558 6/1986 Japan .................................. 426/270

Primary Examiner—Donald E. Czaja
Assistant Examiner—D. Workman
Attorney, Agent, or Firm—Herbert Dubno

[57] ABSTRACT

A method of making black pasta, expecially filled pasta such as tortellini and ravioli, in which powdered walnut hull and dried spinach are incorporated in the dough of the pasta and, after the pasta is formed, it is subjected to a pasteurization or sterilization with steam to impart a black coloration to the dough.

7 Claims, No Drawings

METHOD FOR BLACK DYEING PASTA FOODSTUFFS, AND FOODSTUFFS OBTAINED BY SAID METHOD

FIELD OF THE INVENTION

This invention relates to a process for dyeing pasta, and particularly stuffed pasta, such as tortellini and ravioli.

BACKGROUND OF THE INVENTION

Many attempts have been made to make black pasta, both stuffed and non-stuffed. Because chemical additives are forbidden by law, various natural substances have been used, such as chocolate, the so-called sepia, bone black and similar substances. These processes have led to unsatisfactory results, because the finished products were greyish in color, and did not appeal to the eye.

Furthermore, substances such as "sepia black" caused alterations of taste and flavor, making the pasta treated with this method scarcely fit for the different sauces.

OBJECTS OF THE INVENTION

The object of this invention is to provide a process which will impart to pasta, of any kind and shape, including stuffed pasta, a bright black color, without alterations of taste or flavor, and without the use of detrimental dyes. Another object of this process is to improve pasta by the addition of natural essence of truffle in specific dosage to the filling of stuffed pasta, such as for tortellini, ravioli and the like, to make it more desirable.

SUMMARY OF THE INVENTION

During the initial phase of pasta making, the dough is made with the usual ingredients, such as flour and eggs, to which powdered walnut hull and freeze-dried spinach in given dosages are added. In the next step, the pasta is dyed black by steam pasteurizing the composition to yield the finished product.

SPECIFIC DESCRIPTION

The dough is processed in kneading machines together with powdered walnut hull, preferably in a dosage of 50 grams of powdered walnut hull per 1 Kg. of flour and 6 eggs, and with 30 gr. of freeze-dried spinach.

In case of stuffed pasta, the filling, made with the traditional ingredients, i.e. meat, eggs, cheese and possibly vegetables, can be enriched with natural truffle essence.

These kinds of pasta, made with appropriate forming machines (molds, presses, dies, etc., according to the kind and shape) are then subjected to pasteurization or sterilization.

This process, which uses a thermal treatment performed on an industrial scale, is preferably carried out by putting the product, after it has been made, in a container filled with steam at a given temperature and for a period of time sufficient to turn the pasta black. This treatment, wich can be defined as a pasta precooking treatment, gives the product, particularly tortellini and ravioli, a bright, smooth black color due to the reaction of the ingredients, especially of the powdered walnut hull of the dough, which also allows the preservation of the fresh product for 15/20 days at least.

After pasteurization has been completed, the "black" products are subjected to a forced ventilation treatment for packaging, and then other possible treatments, such as drying, deep-freezing, etc., which are common in the food industry, for preservation.

The aforesaid treatment, which is performed during various processing phases using the traditional means and equipment of the pasta making industry (kneading machines, conveyor belts, etc.) can be applied both to the normal kind of pasta and to stuffed pasta, according to the specific needs.

I claim:

1. A method of making black pasta which comprises the steps of:
    (a) forming a pasta dough;
    (b) incorporating into said pasta dough a quantity of powdered walnut hull and a quantity of freeze-dried spinach sufficient to impart to said dough a black coloration upon treatment with steam;
    (c) shaping the dough to which the powdered walnut hull and freeze-dried spinach have been added to form a pasta product;
    (d) treating said product with steam to impart a black coloration to said pasta product; and
    (e) packaging the pasta product subsequent to the treatment thereof with steam to form said black coloration.

2. The method defined in claim 1 wherein in step (c), said dough is filled with a tortellini or raviola filling and is shaped into tortellini or ravioli.

3. The method defined in claim 2, further comprising the step of incorporating into said filling a natural truffle essence.

4. The pasta product made by the method of claim 1.

5. A pasta product comprising a pasta dough containing powdered walnut hull and freeze-dried spinach and which has been treated with steam to impart a bright black coloration to the pasta product.

6. The pasta product defined in claim 5 in the shape of tortellini or ravioli and containing a tortellini or ravioli filling to which natural truffle essence has been admixed.

7. The pasta product defined in claim 5 wherein said dough contains substantially 50 grams of powdered walnut hull per 1 kilogram of flour and six eggs and 30 grams of freeze-dried spinach.

* * * * *